Feb. 7, 1950    J. R. BARTON    2,496,616
METHOD OF APPLYING AND ANCHORING A CONCRETE
SHEATHING TO A RAMMED EARTHWALL
Filed March 24, 1947    2 Sheets-Sheet 1

INVENTOR
JAMES R. BARTON
By G. F. McDougall.
ATTORNEY

Feb. 7, 1950 J. R. BARTON 2,496,616
METHOD OF APPLYING AND ANCHORING A CONCRETE
SHEATHING TO A RAMMED EARTHWALL
Filed March 24, 1947 2 Sheets-Sheet 2

INVENTOR
JAMES R. BARTON
By G. F. McDougall
ATTORNEY

Patented Feb. 7, 1950

2,496,616

UNITED STATES PATENT OFFICE 2,496,616

METHOD OF APPLYING AND ANCHORING A CONCRETE SHEATHING TO A RAMMED EARTHWALL

James R. Barton, Portland, Oreg.

Application March 24, 1947, Serial No. 736,736

3 Claims. (Cl. 18—59)

This invention relates to a method of applying a well anchored thin, weather-resistant cementitious coating to walls of rammed earth.

It is being recognized that the wealth of timber that covered the United States in pioneer days has been used or wasted to the point that interior finish is about the extent of demand that it can be expected to sustain, even with far more careful use than has been heretofore applied.

Rammed earth walls will last for centuries, have high insulation values, are vermin proof and have good strength of structure, but have one Achilles heel. Where storms are more or less horizontal, an outer cementitious coat is absolutely essential. For further pertinent information, reference is given to "Rammed Earth Wall," revised bulletin South Dakota State College, No. 277; Bulletin 336 South Dakota Ag. Experiment Station; Bulletin No. 3, Engrg. Experiment Sta. Clemenson Ag. College, South Carolina. National Bureau of Standards Report, BMS 78 is pertinent.

Painting, whitewashing, cement washes, plaster coats and many other expedients have been tried, but the rammed earth does not provide a satisfactory bonding surface and much of it provides almost none. At best, the natural earth materials suitable to make rammed earth walls, omitting the exterior coating adaptability, is far wider and more comprehensive than the materials that can accept and retain an exterior coat with even a fair life expectancy.

It is an object of this invention to add to the rammed earth wall art a method of concurrently applying relatively thin, weatherproof wall coatings to rammed earth walls when built, at a cost of materials and application that will compare favorably with the cost of subsequently applied coats and have a like expectancy which, barring accidents or earth upheavals, is as great as the wall.

Drawings accompany and form a part of this specification illustrating steps of procedure and tools necessary to carry out the method; but the disclosure as explained hereinafter is to be regarded as illustrative and the scope of the invention is to be ascertained from the claims.

Drawings accompany and form a part of this specification, in which—

Describing the structure and how it is built, more in detail.

Numeral 1 indicates a foundation wall, which may be of cement concrete, or, under favorable ground conditions with good drainage, may be itself of rammed earth made in the way about to be described for making the above ground wall.

Numeral 2 represents the rammed earth, which will be a composition of sand and clay, either natural or compounded from assembled materials, usually the former which, by employment of the invention, greatly increases the number of different earth compositions that are available. Numeral 3 represents an outside form, shown as to its contact surface with the wall only and both it and the inside form 4, must be of substantial design to stand ramming of the earth between them; which is schematically shown by the timberwork 3' and 4'. Numeral 5 represents the outside sheath or weather surface of cement concrete, which latter term is intended to be understood broadly as including other suitable bonding material than Portland cement, though at present that substance is deemed to be the best from every viewpoint.

Figures 1, 2:
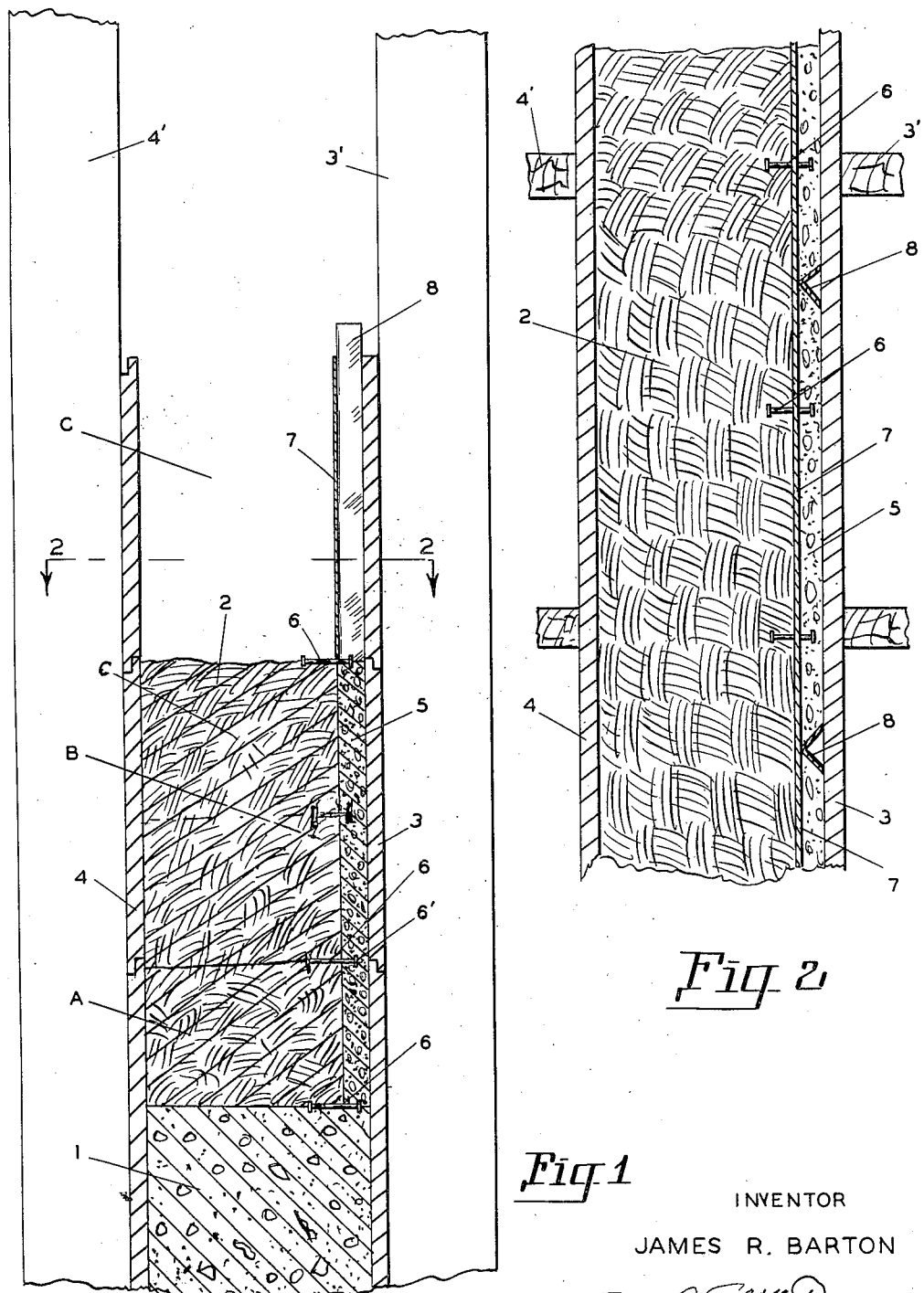
Fig. 1 is a vertical section of a rammed earth wall with an anchored cement concrete sheath on its weather surface, the section being taken shortly after the construction has been started.
Fig. 2 represents a horizontal section on 2—2, Fig. 1.
Figure 3:
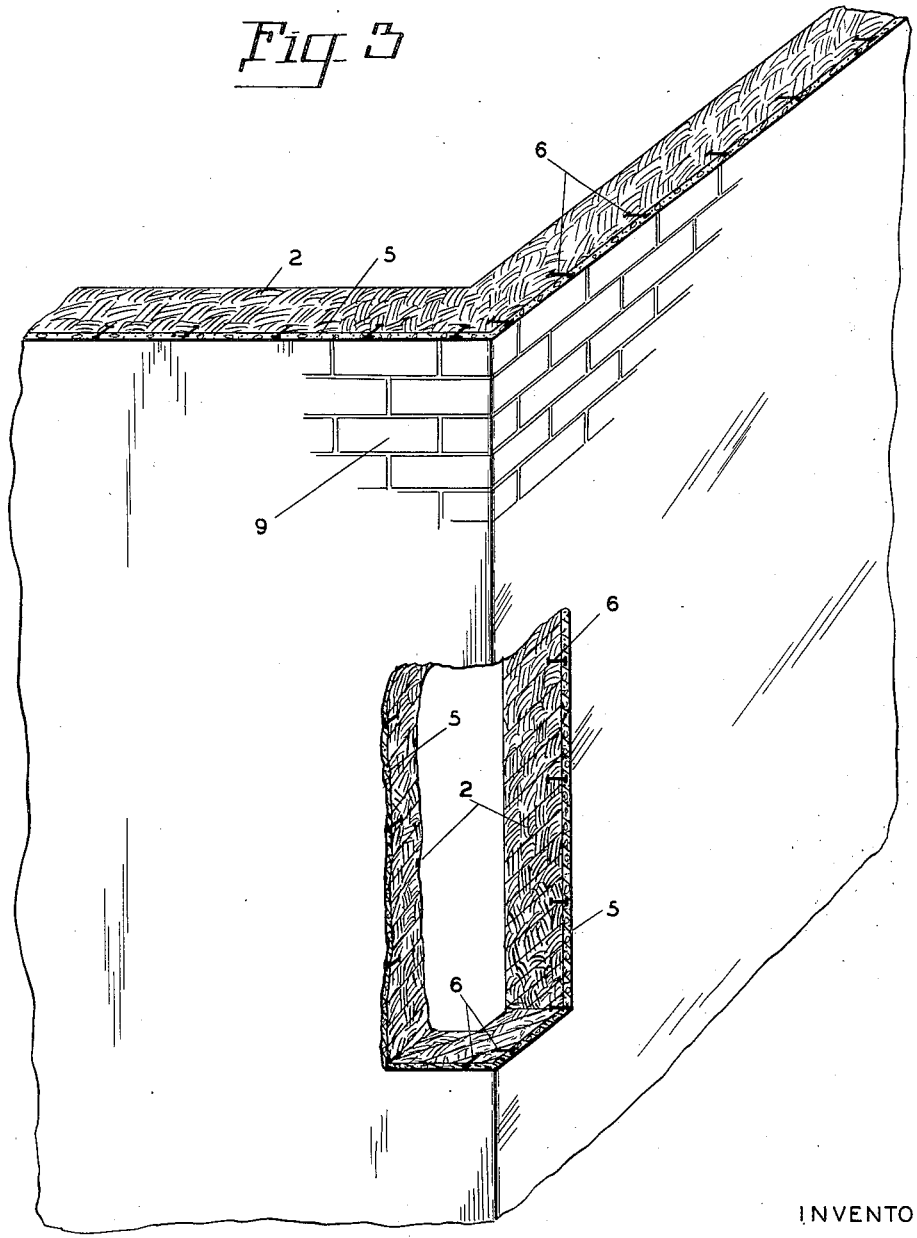
Fig. 3 is a portion of a complete rammed earth wall in perspective, from which a center section has been removed to show how it looks after building.

Numeral 6 represents the anchors, preferably of metal; and the anchors may be made of long wire nails with a short bit of the point bent over as shown at 6' in Fig. 1 or, preferably, as may follow the general adoption of the invention in rammed earth wall construction, a double headed wire, similar to say a 30 d. wire nail with a head on both ends.

We will assume that the portion of wall 2, shown in vertical section in Fig. 1, contains three courses each, say 6 inches high. When the first course was in preparation for starting, the first step was to place the inside and outside forms on the foundation 1, in vertical spaced relationship, the space being that of the expected finished wall thickness.

Then a bottom row of anchors such as 6, the lowermost one in Fig. 1, was placed along the top surface of the foundation 1. Next, and here is the beginning of the invention, the metal separator strip 7 was laid edgewise on top of the anchors 6, just as it is shown resting on a similar row of anchors 6, the uppermost anchor numeral in Fig. 1.

To improve spacing, the distance pieces 8, loose separate elements, which may be of any desired form but preferably of angularly bent sheet metal as shown at 8 in Fig. 2, are placed between the separator strip 7 and the outside form 3. The thickness of the distance pieces is indicative of the final thickness of the concrete sheath. These distance pieces are removed as soon as enough rammed earth 2, is in place and enough rammed concrete in place on the opposite side of the separator strip 7 to maintain the same in vertical position.

As a result of very wide experience in rammed earth walls, it is usual to ram an initial course of shoveled in earth from say twelve inches loose height down to six inches compacted height. It is not the purpose of this disclosure to instruct on the mixture and tempering of the earth material as there is a wealth of information on that subject; but the concrete that makes up the sheath should be made as an original "dry-mix" such as is used in making concrete drainage tile and for innumerable other constructions, and also requires ramming but less on the average than the earth materials. However, the ramming of both earth and concrete should proceed concurrently to the end that the strip 7 shall maintain a substantially straight line position, horizontally and vertically, between the earth and the green concrete. If the proposed plan of originally compacting a foot of comparatively loose earth material down to six inches is followed, the width of the separator strip 7 should be a bit more than twelve inches. After the earth and concrete have been rammed so that their upper surfaces are about in the same horizontal plane, two workmen with flat nosed pliers, for example, lift the separator strip out of its place and another row of anchors such as the second anchor 6', Fig. 1, is placed. This forms an excellent support for the separator strip 7 which is again placed and the steps repeated for making the next course. Fig. 1 shows that three courses, A, B and C are completed and course D is ready to start. The tamping necessary on the next upper course will promptly close up the very thin gap left by lifting out the separator strip 7. It will be well to make the separator strips 7 of aluminum, magnesium metal, or at least something that does not rust, to let it pull readily; and a thickness fairly close to 15 gage (B & S) should be satisfactory.

Instead of double heads, other assymmetrical forms of anchors may be found sufficient, especially if the part in the earth is relatively long. Window and door openings are built in around a placed casing as in other built up wall construction, and it will be understood that the bottom of such a casing will rest on an especially well smoothed and level rammed supporting surface. The outside form 3 may have a metal lining 9 stamped to imitate brick work and the thin concrete sheath 5 may contain coloring matter if desired, for appearance sake, as is well known in concrete work.

By following the steps as disclosed, a permanent attachment of a concrete weather resistant sheath overcomes the only inherent weakness of rammed earth walls, which are summed up by South Dakota State College, ". . . impossible to equal a wall of this kind—almost a perfect insulator . . . fireproof, soundproof, weatherproof—proof against termites—made of satisfactory soil and stuccoed properly it is absolutely permanent." The above quote does not refer to or include the invention; "Stucco" needs expanded metal as it will not adhere to rammed earth and expanded metal must be anchored. Rammed earth, when green, accepts driven nails easily but is not resilient like wood and nails lack holding power. Stucco has been since abandoned according to later literature. The process steps of the invention are of less cost as the expanded metal is omitted and the labor necessary to build the wall is less.

Having fully disclosed my new method of construction of rammed earth walls which results in a wall that is of itself new, having double headed anchors holding the concrete and earth together, what I claim as new and desire to secure by Letters Patent, is:

1. The method of applying an anchored concrete sheathing to a rammed earth wall which consists in erecting inside and outside wall forms, concurrently ramming suitable earth mixtures and concrete aggregates between the said forms in courses with a relatively thin separator strip in place to define the relative thickness of the rammed earth and the concrete sheathing, pulling the said separator strip after ramming both earth matter and concrete to about the same horizontal plane, placing anchors of approved form to bridge the gap left by pulling the separator strip, replacing and supporting the said separator strip above the said anchors and repeating the said steps in a superposed course until the wall has reached a desired height.

2. The method of applying an anchored concrete sheathing to a rammed earth wall which consists in erecting inside and outside wall forms, concurrently ramming suitable earth mixtures and concrete aggregates between the said forms in courses with a relatively thin separator strip in place to define the relative thickness of the rammed earth and the concrete sheathing, pulling the said separator strip after ramming both earth matter and concrete to about the same horizontal plane, placing double head anchors of approved form to bridge the gap left by pulling the separator strip, replacing and supporting the said separator strip above the said anchors and repeating the said steps in a superposed course until the wall has reached a desired height.

3. The method of building a rammed earth wall with a concurrently applied concrete sheathing, which consists in ramming both earth matter and concrete aggregates of suitable composition, concurrently, between supported wall forms, in horizontal courses, placing a separator strip within the space defined by said forms to keep the concrete aggregates and the earth matter apart until a course has been rammed, withdrawing the said separator strip after a course is rammed, placing anchors of suitable form and material to bridge the gap where the said separator strip was withdrawn, replacing the said separator strip, and repeating the steps to form and anchor subsequent superposed courses of rammed earth and concurrently rammed concrete.

JAMES R. BARTON.

REFERENCES CITED

The following references are of record in the file of this patent:

UNITED STATES PATENTS

| Number | Name | Date |
| --- | --- | --- |
| 705,156 | Stevens | July 22, 1902 |
| 929,938 | Haldeman | Aug. 3, 1909 |
| 1,475,570 | Dye | Nov. 27, 1923 |
| 1,655,676 | Daggett | Jan. 10, 1928 |
| 1,777,926 | Lillard | Oct. 7, 1930 |
| 1,795,655 | MacDonald | Mar. 10, 1931 |
| 1,902,178 | Nelson | Mar. 21, 1933 |